(12) United States Patent
Chen et al.

(10) Patent No.: US 11,544,423 B2
(45) Date of Patent: Jan. 3, 2023

(54) COMPUTER SIMULATION OF PHYSICAL FLUIDS ON A MESH IN AN ARBITRARY COORDINATE SYSTEM

(71) Applicant: Dassault Systemes Simulia Corp., Johnston, RI (US)

(72) Inventors: Hudong Chen, Newton, MA (US); Raoyang Zhang, Burlington, MA (US); Pradeep Gopalakrishnan, Woburn, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 1033 days.

(21) Appl. No.: 16/236,799

(22) Filed: Dec. 31, 2018

(65) Prior Publication Data

US 2020/0210539 A1 Jul. 2, 2020

(51) Int. Cl.
| | |
|---|---|
| *G06F 30/20* | (2020.01) |
| *G01P 5/00* | (2006.01) |
| *G06N 7/08* | (2006.01) |
| *G06F 111/10* | (2020.01) |

(52) U.S. Cl.
CPC .............. *G06F 30/20* (2020.01); *G01P 5/00* (2013.01); *G06N 7/08* (2013.01); *G06F 2111/10* (2020.01)

(58) Field of Classification Search
CPC ...... G06F 30/20; G06F 2111/10; G06F 30/15; G06F 30/28; G01P 5/00; G06N 7/08
See application file for complete search history.

(56) References Cited

U.S. PATENT DOCUMENTS

| | | | |
|---|---|---|---|
| 5,594,671 A | 1/1997 | Chen et al. | |
| 5,910,902 A * | 6/1999 | Molvig | G06F 30/23 |
| | | | 702/47 |
| 7,542,885 B1 | 6/2009 | Majumdar | |
| 2010/0169062 A1 | 7/2010 | Linn et al. | |

(Continued)

OTHER PUBLICATIONS

Chen, "Volumetric formulation of the lattice Boltzmann method for fluid dynamics: Basic concept," Physical Review E 58, No. 3, Mar. 25, 1998, pp. 3955-3963.

(Continued)

*Primary Examiner* — Francis C Gray
(74) *Attorney, Agent, or Firm* — Fish & Richardson P.C.

(57) ABSTRACT

Computer implemented techniques for simulating a fluid flow about a surface of a solid, include receiving a coordinate system for representation of a curvilinear mesh that conforms to the surface of the solid, simulating, with a lattice velocity set transport of particles in a volume of fluid, with the transport causing collision among the particles, executing a distribution function for transport of the particles, with the distribution function including a particle collision determination and a change in particle distribution associated with the curvilinear mesh, performing by the computing system, advection operations in the coordinate system under constraints applied to particle momentum values and mapping by the computer system values resulting from simulating onto the curvilinear mesh by translation of the particle momentum values and spatial coordinates determined in the coordinate system into momentum and spatial values in the curvilinear space.

20 Claims, 14 Drawing Sheets

(56) References Cited

U.S. PATENT DOCUMENTS

| | | | |
|---|---|---|---|
| 2010/0250205 A1* | 9/2010 | Velazquez Lopez | G06F 30/23 703/2 |
| 2011/0268147 A1 | 11/2011 | Bornoff et al. | |
| 2011/0289043 A1 | 11/2011 | Suresh et al. | |
| 2013/0151221 A1 | 6/2013 | Chen et al. | |
| 2013/0246024 A1* | 9/2013 | Rodriguez | G06F 30/23 703/2 |
| 2014/0136159 A1* | 5/2014 | Chen | G06F 17/11 703/2 |
| 2015/0356217 A1 | 12/2015 | Chen et al. | |
| 2016/0188768 A1 | 6/2016 | Gopalakrishnan et al. | |
| 2016/0321384 A1* | 11/2016 | Pal | B22F 10/20 |
| 2020/0050715 A1 | 2/2020 | Krishnamurthy et al. | |
| 2020/0394277 A1 | 12/2020 | Krishnamurthy et al. | |

OTHER PUBLICATIONS

Bardow et al., "General characteristic-based algorithm for off-lattice Boltzmann simulations," EPL (Europhysics Letters) 75, No. 3, Aug. 1, 2006, 434-440.

Imamura et al., "Acceleration of steady-state lattice Boltzmann simulations on non-uniform mesh using local time step method," Journal of Computational Physics 202, No. 2, Sep. 15, 2004, pp. 645-663.

McNamara et al., "Stabilization of Thermal Lattice Boltzmann Models," Journal of Statistical Physics 81, No. 1,: 395-408.

Zarghami et al., "Lattice Boltzmann Finite Volume Formulation with Improved Stability," Jan. 16, 2012, Communications in Computational Physics 12, No. 1, 42-64.

Zhang et al., "Effective volumetric lattice Boltzmann scheme," Apr. 24, 2001, Physical review E, vol. 63, No. 5056705, 6 pages.

Ambrus et al., "High-order quadrature-based lattice Boltzmann models for the flow of ultrarelativistic rarefied gases," Phys. Rev., Sep. 2018, 98:035201.

Bo et al., "Numerical simulation of thermal flow of power-law fluids using lattice Boltzmann method on non-orthogonal grids". International J. of Heat and Mass Transfer, May 2018, 126:293-305.

Extended European Search Report in EP Appln. No. 20179651.3, dated Nov. 5, 2020, 12 pages.

McNamara et al., "Stabilization of thermal lattice Boltzmann models. Journal of Statistical Physics," Oct. 1, 1995, 81(1-2):395-408.

Extended European Search Report in EP Appln. No. 19218794.6, dated May 12, 2020, 6 pages.

Guo and Zhao, "Explicit finite-difference lattice Boltzmann method for curvilinear coordinates," Phys. Rev. E 2003, 67(6):066709, 12 pages.

* cited by examiner

COMPUTER SIMULATION OF PHYSICAL FLUIDS ON A MESH IN AN ARBITRARY COORDINATE SYSTEM

BACKGROUND

This description relates to computer simulation of physical processes, such as physical fluid flows.

The so called "Lattice Boltzmann Method" (LBM) is an advantageous technique for use in computational fluid dynamics. The underlying dynamics of a lattice Boltzmann system resides in the fundamental physics of kinetic theory that involves motion of many particles according to the Boltzmann equation. There are two fundamental dynamical processes in a basic Boltzmann kinetic system collision and advection. The collision process involves interactions among particles obeying conservation laws and to relax to an equilibrium. The advection process involves modeling movement of particles from one location to another according to the particles microscopic velocities.

In a standard LBM model, particle velocity takes on a discrete set of constant values, and the latter form exact links from one lattice site to its neighboring sites on a simple Bravais lattice corresponding to a three dimensional (3D) uniform cubical Cartesian mesh.

Various attempts have been made to extend LBM to meshes based on arbitrary coordinate systems (arbitrary mesh(es)). One of the main representative approaches is to relax a one-to-one advection mapping between a pair of lattice sites. On such arbitrary meshes, a particle after advection from its original mesh site does not in general land on a single neighboring site. In those solutions, the location of the particle is represented by those mesh sites by interpolation.

SUMMARY

While important in many applications, a uniform cubical Cartesian mesh poses fundamental limitations for other applications. For example, often in realistic fluid simulations, the simulation is of a solid geometric curved surface. A Cartesian mesh does not present a smooth conformance to a solid geometric curved surface. In addition, a realistic physical flow usually has small structures concentrated in certain spatial areas and directions. For instance, in the so called turbulent boundary layer, the flow scale normal to the wall is much smaller than in the tangential direction or in the bulk of the fluid region. Consequently, the requirement on spatial resolution is significantly higher in the normal direction to the wall inside a boundary layer. A cubic Cartesian mesh does not provide the flexibility with different spatial resolutions in different directions.

According to an aspect, a computer implemented method for simulating a fluid flow about a surface of a solid, includes receiving by the computing system, a coordinate system for representation of a curvilinear mesh that conforms to the surface of the solid, simulating, with a lattice velocity set transport of particles in a volume of fluid, with the transport causing collision among the particles, executing a distribution function for transport of the particles, with the distribution function including a particle collision determination and a change in particle distribution associated with the curvilinear mesh, performing by the computing system, advection operations in the coordinate system under constraints applied to particle momentum values, and mapping by the computer system values resulting from simulating onto the curvilinear mesh by translation of the particle momentum values and spatial coordinates determined in the coordinate system into momentum and spatial values in the curvilinear space.

Other aspects include computer program products, one or more machine-readable hardware storage devices, apparatuses and computing system.

The approaches disclosed herein extend the current LBM based simulation predicated on Cartesian mesh to non-Cartesian mesh frameworks in curvilinear space. The approaches disclosed herein are based on a volumetric formulation so that mass and momentum conservations are satisfied. The resulting continuity equation of mass will have the correct form in curvilinear coordinates, and therefore the approach does not need to introduce any artificial mass source terms to correct for artifacts in the resulting hydrodynamics. In addition, as in continuum kinetic theory on a manifold, the only external source term in the disclosed extended LBM is due to the presence of an inertial force due to the curvilinear space. This inertial force term contributes no mass and is constructed without relying on the analytical form in the continuum kinetic theory.

This inertia force term in discrete space and time recovers asymptotically the force in the continuum kinetic theory in the hydrodynamic limit. Further, the inertial force enforces the exact momentum conservation for underlying Euclidian space in the discrete space-time LBM model. The force term is constructed so that the force term adds momentum to the system at proper discrete time moments in order to produce the correct resulting Navier-Stokes hydrodynamics at the viscous order.

Other features and advantages will be apparent from the following description, including the drawings, and the claims.

DESCRIPTION

Model Simulation Space

Figure 1:
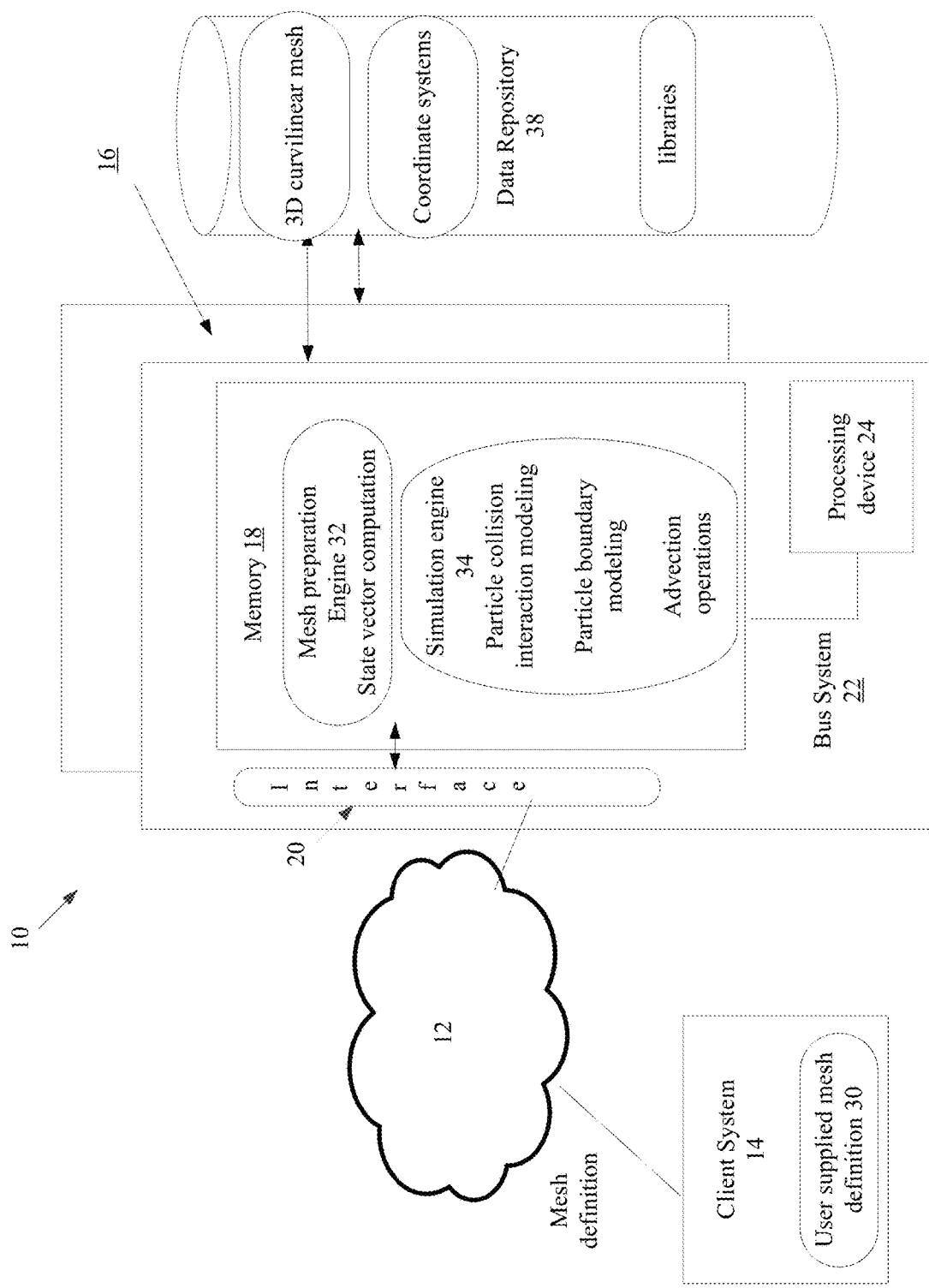
FIG. 1 depicts a system for simulation of fluid flows.

In a LBM-based physical process simulation system, fluid flow is represented by the distribution function values $f_i$, evaluated at a set of discrete velocities $c_i$. The dynamics of the distribution function is governed by Equation I.1, $$f_i(x+c_i,t+1)=f_i(x,t)+C_i(x,t) \qquad \text{Eq. (I.1)}$$

This equation is the well-known lattice Boltzmann equation that describes the time-evolution of the distribution function, $f_i$. The left-hand side represents the change of the distribution due to the so-called "streaming process." The streaming process is when a pocket of fluid starts out at a mesh location, and then moves along one of plural velocity vectors to the next mesh location. At that point, the "collision factor," i.e., the effect of nearby pockets of fluid on the starting pocket of fluid, is calculated. The fluid can only move to another mesh location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator can be, but not limited to, of the Bhatnagar, Gross and Krook (BGK) operator. The collision operator forces the distribution function to go to the prescribed values given by the second equation, which is the "equilibrium" form.

$$f_i^{eq} = \rho w_i \left[ 1 + \frac{c_i^\alpha u^\alpha}{T_0} + \frac{1}{2T_0}\left(\frac{c_i^\alpha c_i^\beta}{T_0} - \delta^{\alpha\beta}\right)u^\alpha u^\beta \right] \qquad \text{Eq. (I.2)}$$

The BGK operator is constructed according to the physical argument that, no matter what the details of the collisions, the distribution function approaches a well-defined local equilibrium given by $\{f^{eq}(x, v, t)\}$ via collisions:

$$C = -\frac{1}{\tau}(f - f^{eq}),$$

where the parameter $\tau$ represents a characteristic relaxation time to equilibrium via collisions.

From this simulation, conventional fluid variables, such as mass $p$ and fluid velocity $u$, are obtained as simple summations in Eq.(I.3) see below.

Due to symmetry considerations, the set of velocity values are selected in such a way that they form certain lattice structures when spanned in the configuration space. The dynamics of such discrete systems obeys the LBM equation having the form $$f_i(x+c_i,t+1)=f_i(x,t)+C_i(x,t)$$

where the collision operator usually takes the BGK form, as described above. By proper choices of the equilibrium distribution forms, it can be theoretically shown that the lattice Boltzmann equation gives rise to correct hydrodynamic and thermo-hydrodynamic results. That is, the hydrodynamic moments derived from $f_i(x, t)$ obey the Navier-Stokes equations in the macroscopic limit. These moments are defined as:

$$\rho(x,t)=\Sigma_i f_i(x,t);\ \rho(x,t)u(x,t)=\Sigma_i c_i f_i(x,t) \qquad \text{Eq.(I.3)}$$

where $\rho$ and $u$ are, respectively, the fluid density and velocity.

The collective values of $c_i$ and $\omega_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken. In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

For a further explanation of conventional LBM-based physical process simulation systems the reading is referred to US Patent Publication US-2016-0188768-A1, the entire contents of which are incorporated herein by reference.

Referring to FIG. 1, a system 10 for simulating fluid flow about a representation of a physical object is shown. The system 10 in this implementation is based on a client-server or cloud based architecture and includes a server system 12 implemented as a massively parallel computing system 12 (stand alone or cloud-based) and a client system 14. The server system 12 includes memory 18, a bus system 11, interfaces 20 (e.g., user interfaces/network interfaces/display or monitor interfaces, etc.) and a processing device 24, i.e., processor devices including one or more microprocessors and/or processing devices. Generally, processing device 24 may include any appropriate processor and/or logic that is capable of receiving and storing data, and of communicating over a network (not shown). In memory 18 are a mesh preparation engine 32 and a simulation engine 34.

While FIG. 1 shows the mesh preparation engine 32 in memory 18, the mesh preparation engine can be a third party application that is executed on a different system than server 12. Whether the mesh preparation engine 32 executes in memory 18 or is executed on a different system than server 12, the mesh preparation engine 32 receives a user-suppled mesh definition 30 and the mesh preparation engine 32 prepares a mesh and sends (and or stores) the prepared mesh to the simulation engine 34. The simulation engine 34 includes a particle collision interaction module, a particle boundary model module and advection operations. The system 10 accesses a data repository 38 that stores 2D and/or 3D meshes (Cartesian and/or curvilinear), coordinate systems, and libraries.

Figure 2:
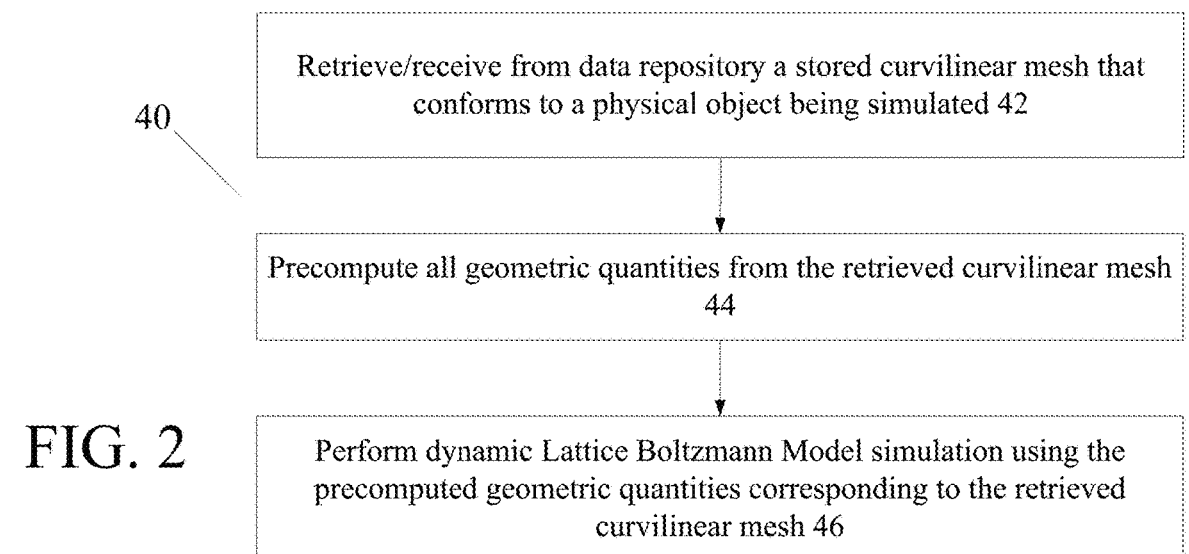
FIG. 2 depicts a flow chart showing operations for formulation of a Lattice Boltzmann Model in curvilinear coordinates.

Referring now to FIG. 2, a process 40 for simulating fluid flow about a representation of a physical object is shown. In this example the physical object is an airfoil. The use of an airflow is merely illustrative, as the physical object can be of any shape, and in particular has curved surface(s). The process receives 42, e.g., from client system 14 or by retrieval from the data repository 38, a mesh, e.g., a curvilinear mesh that conforms to the physical object being simulated. In other embodiments, either an external system or the server 12 based on user input, generates the curvilinear mesh that conforms to the physical object being simulated. The process precomputes 44 geometric quantities from the retrieved curvilinear mesh and performs 46 dynamic Lattice Boltzmann Model simulation using the precomputed geometric quantities corresponding to the retrieved curvilinear mesh.

Figure 3:
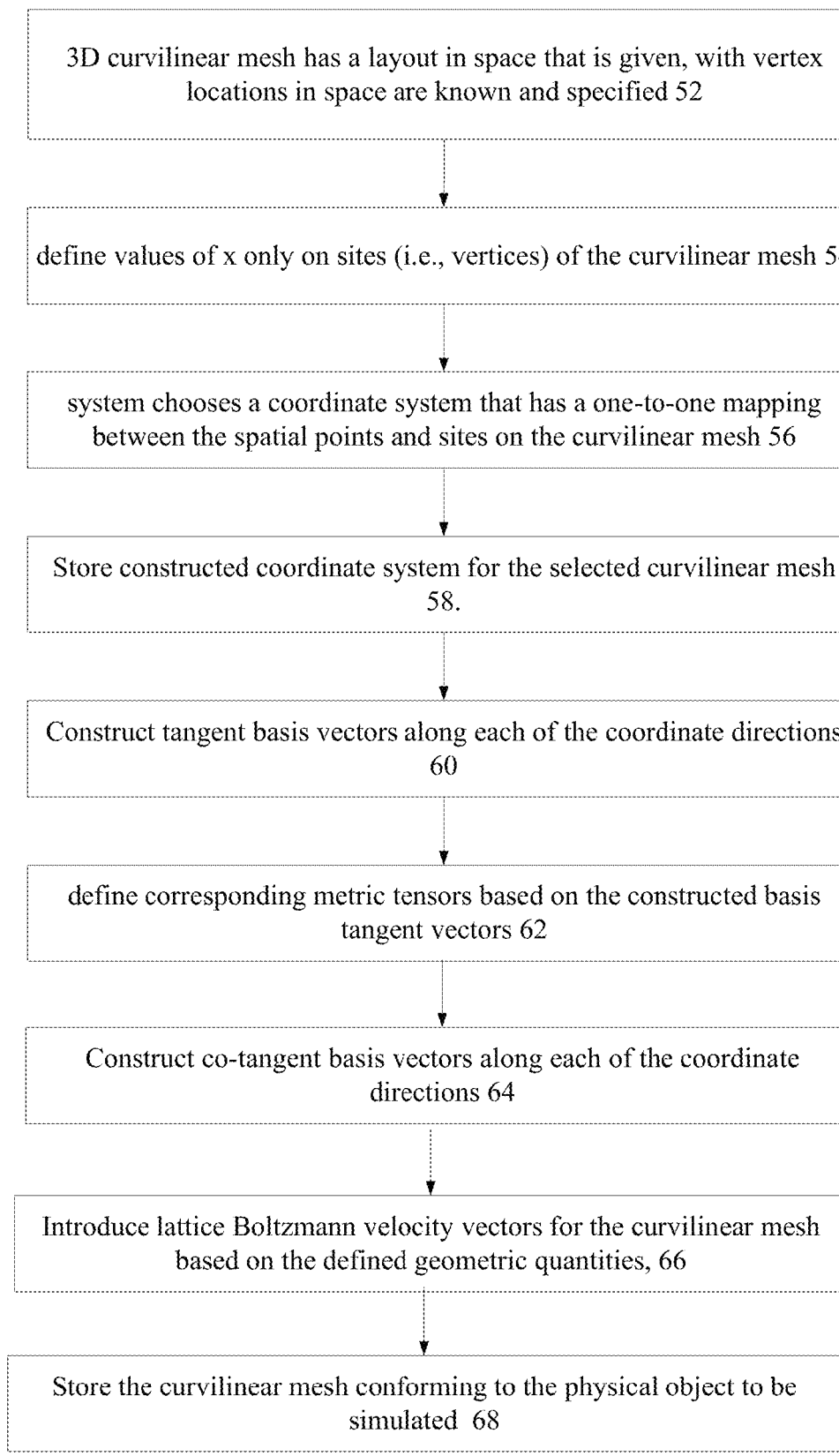
FIG. 3 depicts a flow chart showing operations using a stored curvilinear mesh that conforms to a physical object being simulated.

Referring now to FIG. 3, aspects of a construction 50 of a curvilinear lattice and determination of the precomputed geometric quantities are explained as follows. A curvilinear coordinate system is chosen (conforming to a physical object to be simulated) so that x=x(q) is uniquely defined by q, where q≡($q^1$, $q^2$, $q^3$) are the coordinate values along three non-co-linear congruencies of parameterized basis curves.

The system 10 starts 52 with a 3D curvilinear mesh, in which the curvilinear mesh has a layout in space that is given, so that all its vertex locations in space are known and specified. Let x be any spatial point in the 3-dimensional (3D) Euclidian space. The spatial points x are only defined 54 on sites (i.e., vertices) of the curvilinear mesh. Once the curvilinear mesh is given, (i.e., the 'original' curvilinear mesh {x}) all spatial locations $x_i$ on the mesh {x} are known.

The system 10 chooses 56 a coordinate system {q} that is a one-to-one mapping between the spatial points x and sites (q) on the curvilinear mesh. For any site x on the curvilinear mesh{x}, there is a unique value q associated with x, that is x=x (q) such that x is uniquely defined. The system 10 constructs the coordinate values of q on the mesh as follows:

For any site x(q), on the curvilinear mesh, the site's nearest neighbor site along the $\alpha^{th}$ ($\alpha$=1,2,3) coordinate curve in the positive or negative direction is a spatial point $x_{\pm i}$. Due to this unique mapping $x_{\pm\alpha}$, =x($q_{\pm\alpha}$), where $q_{\pm\alpha}$ is a unique coordinate value for the neighboring site, it is entirely possible to choose the spatial variation of q in such a way that $q_{\pm\alpha}$ and q only differ in their $\alpha^{th}$ coordinate component values by a constant distance ($d_0$), $q_{\pm\alpha}$=($q_{\pm\alpha}^1$, $q_{\pm\alpha}^2$, $q_{\pm\alpha}^3$) and $q_{\pm\alpha}^\beta$-$q^\beta$=$\pm d_0\delta_\alpha^\beta$ where ($\alpha$, $\beta$=1, 2, 3). The constant do is chosen in this example to be unity (1) without loss of generality.

Under this construction, the coordinate values {q} provided a simple, uniform 3D cubic Cartesian lattice structure with lattice spacing of unity (value of do). This morphed "Cartesian" lattice {q} results from deformation (bending, twisting and stretching/compressing) of the original curvilinear mesh {x} in the Euclidian space. Thus, the topological structure of "Cartesian" lattice {q} is the same as the original curvilinear mesh {x}, but the resulting Cartesian lattice is on a non-Euclidian space.

When the curvilinear mesh is provided, the spatial locations of all vertices {x} on the mesh are specified and the distance from any one vertex to another vertex on the curvilinear mesh is also fully determined. A distance vector $D_{\pm\alpha}$ (q) from a site x(q) to one of the site's neighbors x($q_{\pm\alpha}$) ($\alpha$=1; 2; 3) is defined as:

$$D_{\pm\alpha}(q) \equiv x(q_{\pm\alpha}) - x(q); \alpha=1,2,3 \qquad \text{(Equation 1)}$$

For instance, $D_{\pm 1}$ (q)=x ($q^1\pm 1$, $q^2$, $q^3$)-x ($q^1$, $q^2$ $q^3$).

Due to spatial non-uniformity of a general curvilinear mesh, the spatial distance from one mesh site to its nearest neighbor site in general changes from location to location. In other words, $D_{\pm\alpha}$ (q) is a function of q. Furthermore, the distance value in the positive direction along the $\alpha^{th}$ coordinate curve is in general not equal to the distance value in the negative direction.

Explicitly, in terms of the distance vectors, $D_\alpha$ (q)≠-$D_{-\alpha}$ (q). For example, according to the definition given by (Equation 1), $$D_{-1}(q) = x(q^1-1,q^2,q^3) - x(q^1,q^2,q^3) = -D_1(q^1-1,q^2,q^3) \neq -D_1(q) = -(x(q^1+1,q^2,q^3) - x(q^1,q^2,q^3)) \qquad \text{Equation 2}$$

the inequality only turns to an equality everywhere when the curvilinear mesh is a uniform Cartesian lattice (so that |$D_\alpha$|=Const, independent of spatial coordinate value q).

The system 10 can store 58 the constructed coordinate system for the selected curvilinear mesh.

Following concepts in basic differential geometry (Riemannian geometry), the system 10 constructs 60 tangent basis vectors along each of the coordinate directions $$g_\alpha(q) \equiv [D_\alpha(q) - D_{-\alpha}(q)]/2; \alpha=1,2,3 \qquad \text{(Equation 3)}$$

With such a construction, parity symmetry is achieved so that $g_\alpha(q)$=-$g_{-\alpha}(q)$. Unlike a Cartesian coordinate system in Euclidian space, the basis tangent vectors $g_\alpha(q)$($\alpha$=1, 2, 3) of a curvilinear coordinate system are not orthonormal in general. That is, $g_\alpha(\overline{q}) \times g_\beta(\overline{q}) \neq \delta_{\alpha\beta}$.

Therefore, the system 10 constructs 62 a corresponding metric tensor that is defined based on the above basis tangent vectors, as:

$$g_{\alpha\beta}(q) \equiv g_\alpha(q) \cdot g_\beta(q), \alpha,\beta=1,2,3 \qquad \text{(Equation 4)}$$

as well as the volume J of the cell centered at x(q), as $$J(q) \equiv (g_1(q) \times g_2(q)) \cdot g_3(q) \qquad \text{(Equation 5)}$$

and chooses a proper "handedness" so that J (q)>0, where J (q) is a constant in space for a uniform Bravais lattice. (Handedness as used herein refers to a direction convention (typically right hand rule) of a resulting vector as is typically referred to in vector analysis.) It can be verified that $$g(q) = \det[g_{\alpha\beta}(q)] = J^2(q) \qquad \text{(Equation 6)}$$

with det[$g_{\alpha\beta}$(q)] being the determinant of the metric [$g_{\alpha\beta}$(q)] tensor. The co-tangent basis vectors $g^\alpha$(q) ($\alpha$=1, 2, 3) are constructed 64 as:

$$g^1(q) \equiv g_2(q) \times g_3(q)/J(q)$$

$$g^2(q) \equiv g_3(q) \times g_1(q)/J(q)$$

$$g^3(q) \equiv g_1(q) \times g_2(q)/J(q) \qquad \text{(Equation 7)}$$

The basis tangent vectors and the co-tangent vectors are orthonormal to each other, where $\delta_\alpha^\beta$ is the Kronecker delta function.

Similarly, the inverse metric tensor is defined as:

$$q^{\alpha\beta}(q) \equiv g^\alpha(q) \cdot g^\beta(q), \alpha,\beta=1,2,3 \qquad \text{(Equation 8)}$$

and the inverse matric tensor is the inverse of the metric tensor, $[g^{\alpha\beta}(q)]=[g_{\alpha,\beta}(q)]^{-1}$ or $$\sum_{\gamma=1}^{3} g_{\alpha\gamma}(q) g^{\gamma\beta}(q) = \delta_\alpha^\beta \text{ and } \det[g^{\alpha\beta}(q)] = 1/\det[g_{\alpha\beta}(q)].$$

Having the fundamental geometric quantities defined above, the lattice Boltzmann velocity vectors are introduced 66 on a general curvilinear mesh, similar to the velocity vectors on a standard Cartesian lattice.

$$e_i(q) \equiv c_i^\alpha g_\alpha(q) \qquad \text{(Equation 9)}$$

The constant number $c_i^\alpha$ is either a positive or negative integer or zero, and it is the $\alpha^{th}$ component value of the three dimensional coordinate array $c_i \equiv (c_i^1, c_i^2, c_i^3)$. For example, in the so called D3Q19 the Greek indices runs from 0 to 18, $$c_i \in \{(0,0,0),(\pm 1,0,0),(0\pm 1,0),(0,0,\pm 1),(\pm 1,\pm 1,0),(\pm 1,0,\pm 1),(0,\pm 1,\pm 1)\}$$

A set of moment isotropy and normalization conditions are satisfied in order to recover the correct full Navier-Stokes hydrodynamics. These are, when exists a proper set of constant weights $\{\omega_i, i=1, \ldots b\}$ the set of lattice component vectors admit moment isotropy up to the $6^{th}$ order, namely $$\sum_i \omega_i = 1 \qquad \text{(Equation 10)}$$

$$\sum_i \omega_i c_i^\alpha c_i^\beta = T_0 \delta^{\alpha\beta} = T_0 \Delta^{(2),\alpha\beta}$$

$$\sum_i \omega_i c_i^\alpha c_i^\beta c_i^\gamma c_i^\zeta =$$

$$T_0^2 [\delta^{\alpha\beta}\delta^{\gamma\zeta} + \delta^{\alpha\gamma}\delta^{\beta\zeta} + \delta^{\alpha\zeta}\delta^{\beta\gamma}] \equiv T_0^2 \Delta^{(4),\alpha\beta\gamma\zeta}$$

$$\sum_i \omega_i c_i^\alpha c_i^\beta c_i^\gamma c_i^\zeta c_i^\eta c_i^\theta =$$

$$T_0^3 [\delta^{\alpha\beta}\Delta^{(4),\gamma\zeta\eta\theta} + \delta^{\alpha\gamma}\Delta^{(4),\beta\zeta\eta\theta} + \delta^{\alpha\zeta}\Delta^{(4),\beta\gamma\eta\theta} +$$

$$\delta^{\alpha\eta}\Delta^{(4),\beta\gamma\zeta\theta} + \delta^{\alpha\theta}\Delta^{(4),\beta\gamma\zeta\eta}] \equiv T_0^3 \Delta^{(6),\alpha\beta\gamma\zeta\eta\theta}$$

where $T_0$ is a constant temperature and depends on the choice of a set of lattice vectors and $\delta_\alpha{}^\beta$ is the Kronecker delta function. Note that the three dimensional array is $c_i$ whereas, $e_i(q)$ is the lattice vector of Equation 9.

A set of specific geometric quantities are defined for use with the LBM model, as $$\Theta_\beta{}^\alpha(q+c_i, q) \equiv [g_\beta(q+c_i) - g_\beta(q)] \cdot g^\alpha(q) \qquad \text{(Equation 11)}$$

$$\alpha, \beta = 1, 2, 3; i = 0, 1, \ldots, b$$

the term $\Theta_\beta{}^\alpha(q+c_i, q)$ vanishes when the mesh is a uniform Cartesian lattice.

Therefore, once the curvilinear mesh is specified, all the geometric quantities above are fully determined and the curvilinear mesh conforming to the physical object to be simulated can be stored 68, and because the geometric quantities 0 are fully determined these can be pre-computed before starting a dynamic LBM simulation (see FIG. 2).

Figure 4:
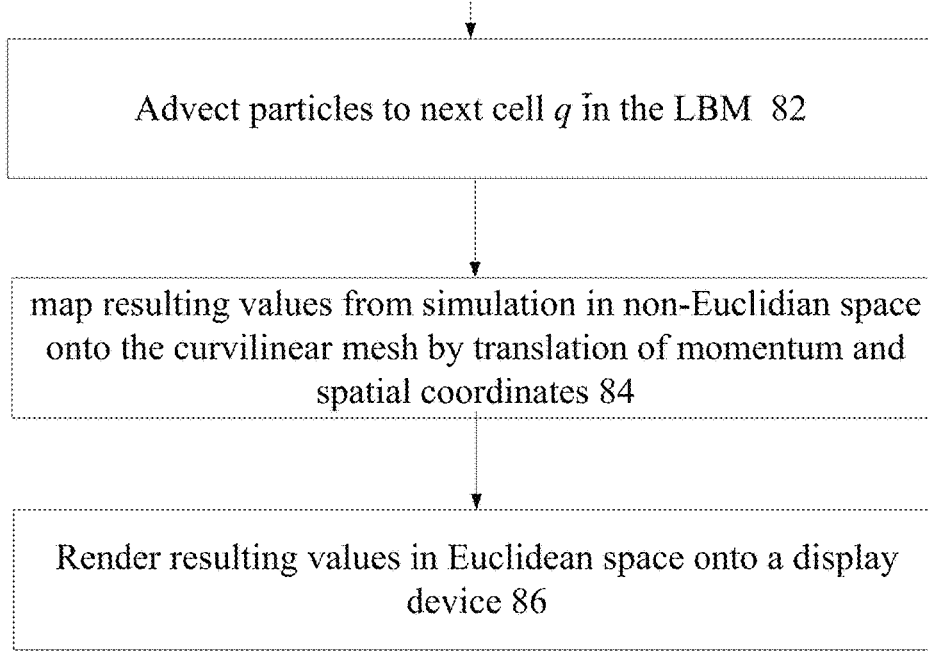
FIG. 4 depicts a flow chart showing simulation operations using a Lattice Boltzmann model expressed in curvilinear coordinates.

Referring to FIG. 4, the simulation process 46 (FIG. 2) simulates 80 evolution of particle distribution according to a modified lattice Boltzmann equation (LBE), e.g., adapted for curvilinear space. The process performs advection 82 of particles to the next cell q in the LBM non-Euclidian space, maps 84 resulting values from the simulation onto the original curvilinear mesh by translation of momentum and spatial coordinates from the coordinate system in non-Euclidean space to the curvilinear system in Euclidean space and renders 86 mapped resulting values in Euclidean space onto a display device, etc.

Figure 5:
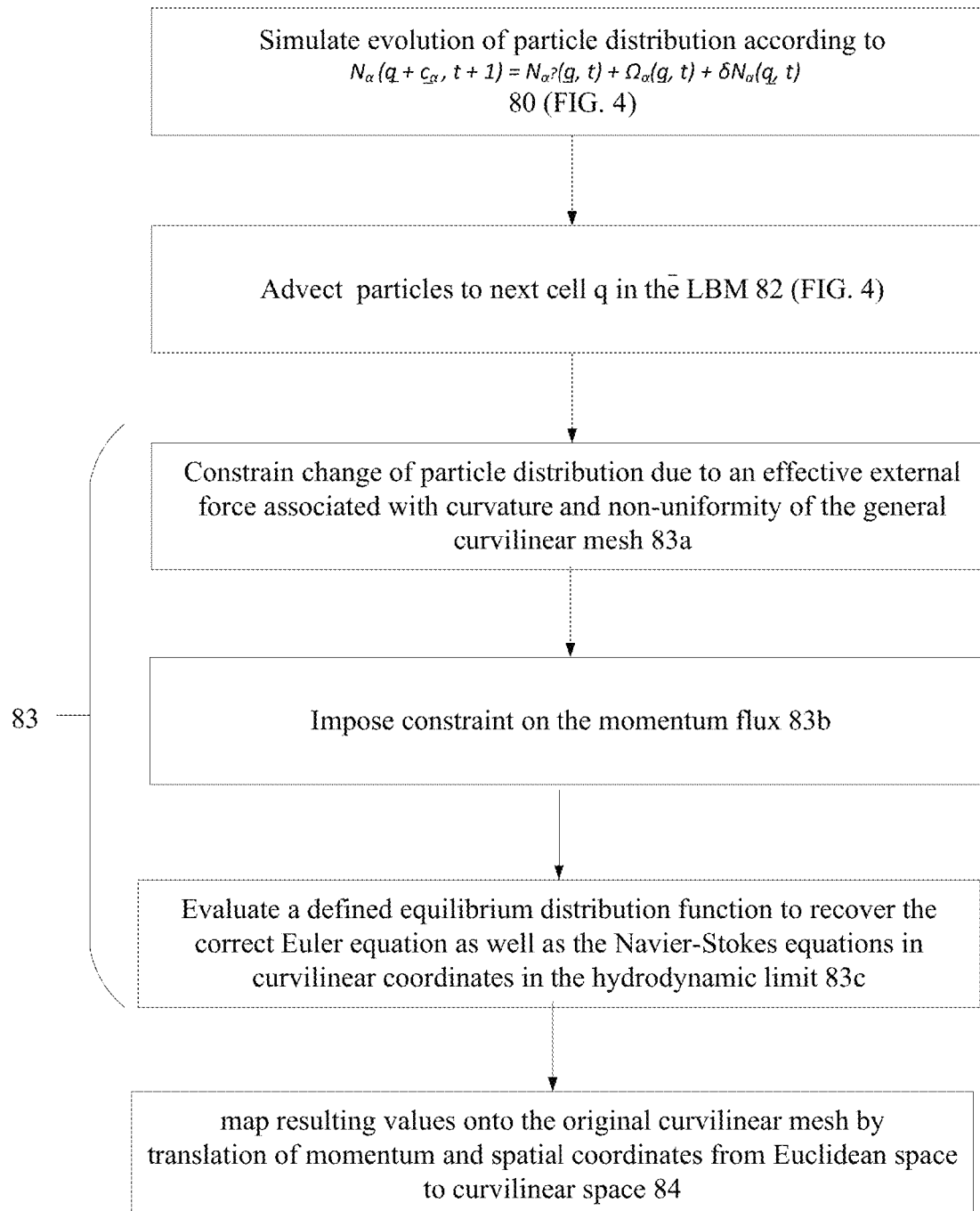
FIG. 5 depicts a flow chart showing constraint operations applied to a distribution function.

Referring to FIG. 5, further details of the simulation process 46 are shown. The simulation process 46 (FIG. 2) simulates 80 (FIG. 4) the evolution of particle distribution according to the modified lattice Boltzmann equation (LBE), e.g., adapted for curvilinear space, see Equation. 12. The process performs the advection 82 (FIG. 4) of particles to the next cell q in the LBM non-Euclidian space. The process places constraints 83 on particle advection. The constraint process 83 constrains 83a change of particle distribution due to an effective external force associated with curvature and non-uniformity of the general curvilinear mesh, imposes 83b a constraint on the momentum flux, uses a defined 83c equilibrium distribution function that recovers the correct Euler equation as well as the Navier-Stokes equations in curvilinear coordinates in the hydrodynamic limit. The process thus maps 84 (FIG. 4) resulting values from the simulation onto the original curvilinear mesh by translation of momentum and spatial coordinates from the coordinate system in non-Euclidean space to the curvilinear system in Euclidean space and renders 86 (FIG. 4) mapped resulting values in Euclidean space onto a display device, etc.

Figure 6B:
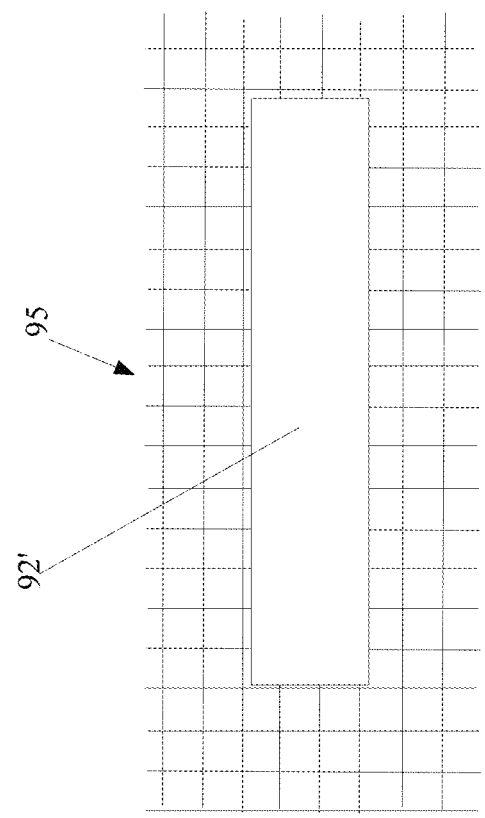
FIGS. 6A-6B depict a representation of a physical object having a shape that is expressed in curvilinear space and Cartesian space.
Figure 6A:
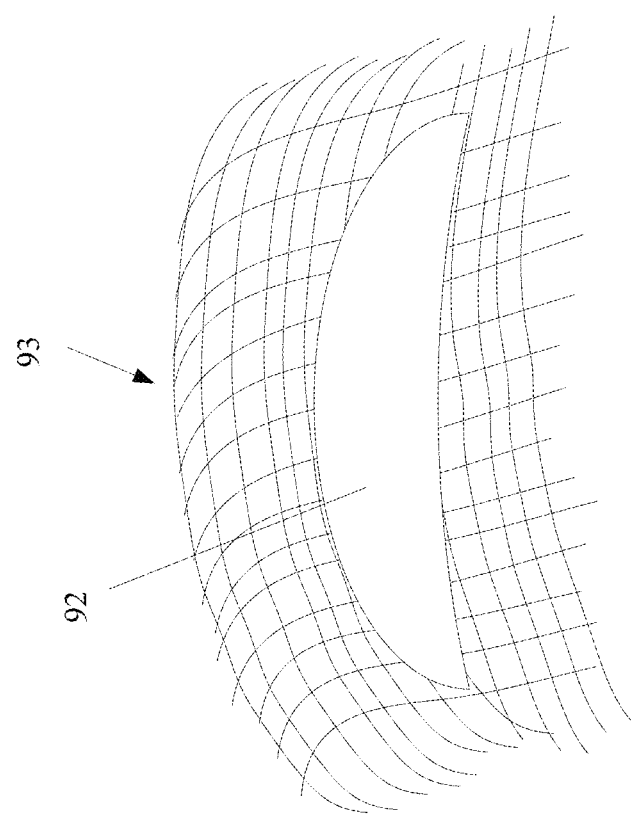

Referring now to FIG. 6A, an airfoil 92 is shown in a general 3D curvilinear mesh 93 in Euclidean space (real-world space) with only 2 dimensions being illustrated (for clarity). As shown the mesh 93 generally conforms to the shape of and specifically the exterior surfaces of the airfoil 92. Conformance can be to a greater degree than that shown or to a lesser degree than that shown in FIG. 6A.

Referring now to FIG. 6B, a representation 92' of the airfoil 92 (of FIG. 6A) is shown in a Cartesian mesh 95 in non-Euclidean space (only 2 dimensions being illustrated). In this example, the representation 92' of the airfoil 92 is illustrated as a rectangular solid (for explanatory purposes only). As shown, the Cartesian mesh 95 generally conforms to the shape of and specifically the exterior surfaces of the representation 92' of the airfoil. Conformance can be to a greater degree than that shown or to a lesser degree than that shown.

Figure 7A:
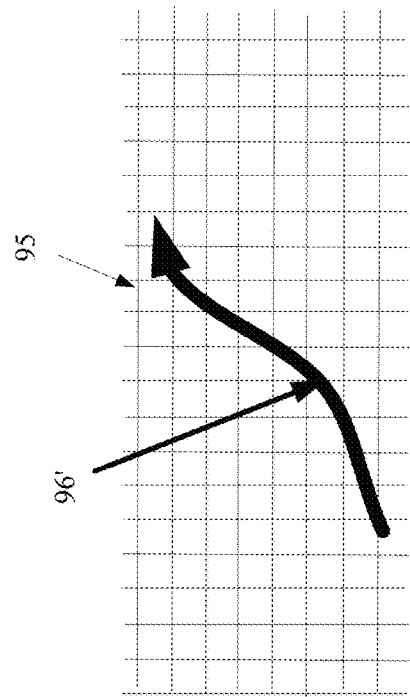
FIGS. 7A-7B depict a representation of movement of a particle in curvilinear space and Cartesian space.
Figure 7B:
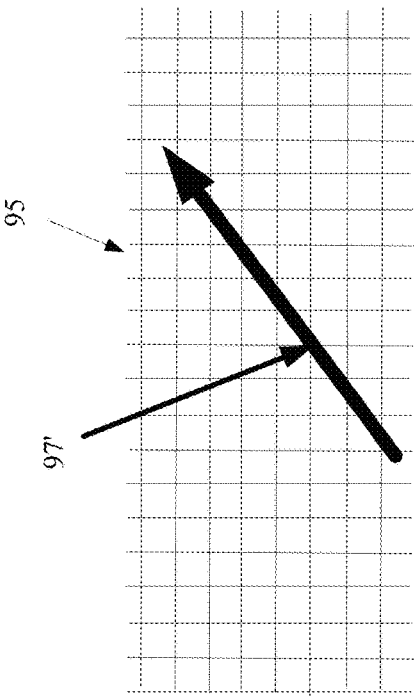

Referring now to FIGS. 7A, 7B a vector 96 representing momentum of a particle of a fluid is shown in the general 3D curvilinear mesh 93 in Euclidean space (real-world space, but with only 2 dimensions being illustrated for clarity). As shown, the vector 96 represents the particle of the fluid moving in a straight line thorough the curvilinear space 96. However, in the morphed Cartesian non-Euclidean space, a vector 96' representing the particle is seen to have a curved motion.

Figure 8A:
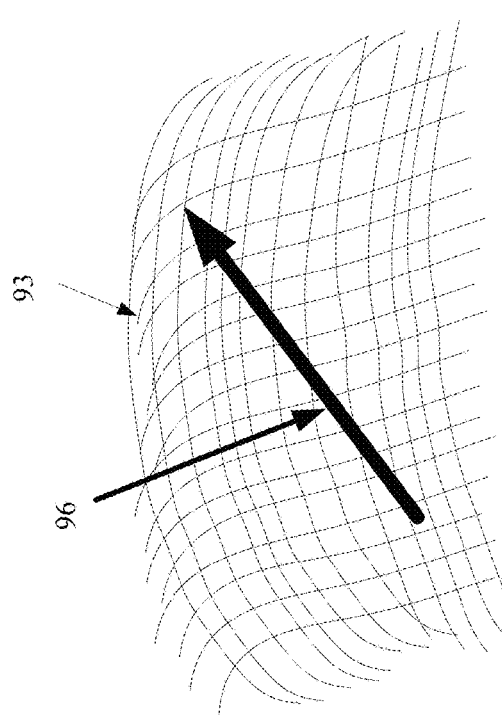
FIGS. 8A-8B depict another representation of movement of a particle in curvilinear space and Cartesian space.
Figure 8B:
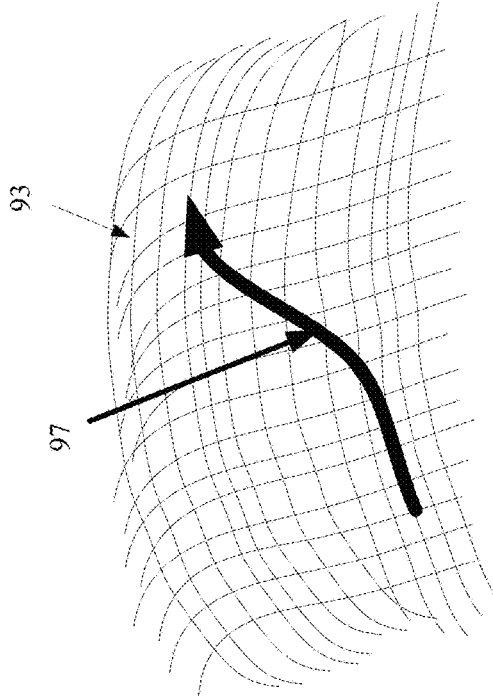

Referring now to FIGS. 8A, 8B, conversely to that of FIG. 7A, 7B, a vector 97 representing momentum of a particle of a fluid is shown in the general 3D curvilinear mesh 93 in Euclidean space (real-world space, but with only 2 dimensions being illustrated for clarity). As shown, the vector 97 represents the particle of the fluid moving in a curved motion thorough the curvilinear space 96. However, in the morphed Cartesian non-Euclidean space a vector 97' representing the particle is seen to have a straight line motion. Specific details of these processes will now be described.

Volumetric Lattice Boltzmann Model on a Curvilinear Lattice

Described is a volumetric lattice Boltzmann model approach, and while this approach is generally applicable for various formulations, for an illustrative example, discussed will be a formulation for the so called "isothermal LBM."

The modified distribution is similar to the standard distribution for evolution of particle distribution. The volumetric lattice Boltzmann model on a curvilinear lattice is provided as:

$$N_i(q+c_i, t+1) = N_i(q, t) + \Omega_i(q, t) + \delta N_i(q, t) \qquad \text{Equation 12}$$

where $N_i(q, t)$ is the number of particles belong to the discrete direction $c_i$ in the cell q at time t for a unity increment of t without loss of generality. The term $\Omega_\alpha(q, t)$ in (Equation 12) is the collision term that satisfies local mass and momentum conservation equations:

$$\sum_i \Omega_i(q, t) = 0 \qquad \text{Equation 13}$$

$$\sum_i e_i(q) \Omega_i(q, t) = 0$$

The extra term $\delta N_i(q, t)$ in Eq. 12 represents the change of particle distribution due to an effective external force associated with the curvature and non-uniformity of the general curvilinear mesh. This extra term vanishes in the standard LBM on a Cartesian lattice.

The particle density distribution function is related to $N_i(q, t)$ by $$J(q)f_i(q,t) = N_i(q,t) \quad \text{Equation 14}$$

where $J(q)$ is the volume of cell centered at q, as defined previously. The fundamental fluid quantities are given by the standard hydrodynamic moments, $$\rho(q, t) = \sum_i f_i(q, t) \quad \text{(Equation 15)}$$

$$\rho(q, t)u(q, t) = \sum_i c_\alpha(q)f_i(q, t)$$

where $\rho(q, t)$ and $u(q, t)$ are fluid density and velocity at the location q and time t.

Using the relationship in (Eq. 9), the velocity moment above is rewritten as $$\rho(q, t)u(q, t) = \sum_i c_i^\alpha g_\alpha(q)f_i(q, t) = \rho(q, t)U^\alpha(q, t)g_\alpha(q) \quad \text{(Equation 16)}$$

and the velocity component value in the curvilinear coordinate system is given by, $$\rho(q, t)U^\alpha(q, t) = \sum_i c_i^\alpha f_i(q, t) \quad \text{(Equation 17)}$$

For simplicity of notation, a three-dimensional fluid velocity array is defined as $U(q, t) \equiv (U^1(q, t), U^2(q, t), U^3(q, t))$ is defined, and Eq. 17 is equivalently expressed as:

$$\rho(q, t)U(q, t) = \sum_i c_i f_i(q, t) \quad \text{(Equation 18)}$$

$$\sum_i c_i \Omega_i(q, t) = 0 \quad \text{(Equation 19)}$$

Eq. 18 has the same form for the fluid velocity as the standard Cartesian lattice based LBM. Similarly, the momentum conservation of the collision term in Eq. 13 can also be written as, $$\Omega_i(q, t) = \sum_j J(q)M_{ij}[f_j(q, t) - f_j^{eq}(q, t)] \quad \text{(Equation 20)}$$

Often in LBM the collision term takes on a linearized form, where $M_{ij}$ and $f_i(q,t)$ represent a collision matrix and the equilibrium distribution function, respectively. In particular, the so called Bhatnagar-Gross-Krook (BGK) form corresponds to $$M_{ij} = -\frac{1}{\tau}\delta_{ij}$$

with τ being the collision relaxation time. In order to recover the correct Navier-Stokes hydrodynamics, besides Eq. 13 and Eq. 19, the collision matrix needs to satisfy an additional condition.

$$\sum_i c_i c_i M_{ij} = -\frac{1}{\tau}c_j c_j \quad \text{(Equation 21)}$$

The BGK form satisfies such an additional property. As mentioned above, the extra term $\delta N_i(q, t)$ in Equation 12 represents the change of particle distribution due to an effective external force associated with the curvature and non-uniformity of a general curvilinear mesh. This extra term vanishes in the standard LBM on a Cartesian lattice. The advection process is an exact one-to-one hop from one site in the curvilinear mesh to another as in the standard LBM, namely $$N_i(q+c_i, t+1) = N_i'(q,t) \quad \text{(Equation 22)}$$

where $N_i'(q, t)$ is the post-collide distribution at (q, t). Due to the curvilinear mesh, while the amount of particles advected from cell q is exactly equal to what arrives at cell $q+c_i$ (see Eq. 22), the momentum changes during the advection.

In general, $$(e_i(q+c_i)N_i(q+c_i,t+1)) \neq e_i(q)N_i'(q,t).$$

In the above equation, the left side of the inequality sign is the momentum value at the end of an advection process while the right side is the value at the beginning of the process. The inequality exists because the path of particles is curved (as well as stretched or compressed) due to the curvilinear mesh, so that its velocity at the end of the advection is changed from its original value. This is fundamentally different from that on a uniform Cartesian lattice, in that the particles have a constant velocity throughout the advection process.

Consequently, the following inequalities are present in the overall momentum values, $$\sum_i e_i(q)N_i)(q, t) \neq \sum_i e_i(q - e_i)N_i^1(q - c_i, t - 1) \quad \text{(Equation 23)}$$

where the right side of the unequal sign in (23) represents the total amount of momentum advected out of all the neighboring cells, while the left side is the total momentum arriving at cell q after advection along the curved paths. Thus from Eq. 22 and Eq. 23, the net momentum change via advection from all the neighboring cells into cell q is given by, $$J(q)x^I(q, t) = -\sum_i [e_i(q) - e_i(q - c_i)]N_i(q, t) \quad \text{(Equation 24)}$$

Likewise, the net momentum change via advection out of cell q to all its neighboring cells is given by $$J(q)x^0(q,t) = -\sum_i [e_i(q+c_i) - e_i(q)]N_i'(q,t) \quad \text{(Equation 25)}$$

Subsequently, if constraints are imposed on $\delta N_i(q,t)$ below:

$$\sum_i \delta N_i(q,t) = 0 \quad \text{(Equation 26)}$$

$$\sum_i e_i(q) \delta N_i(q,t) = J(q)x(q,t)$$

then the mass conservation is preserved and the exact momentum conservation is recovered, for the underlying Euclidian space. Here $$x(q,t) = [x^I(q,t) + x^o(q,t)]/2$$

$$x(q,t) = [x^I(q,t) + x^o(q,t)]/2$$

More specifically, the first constraint in Eq. 26 has no mass source being introduced by $\delta N_i(q,t)$. The second constraint in Eq. 26 introduces an "inertial force" that equals exactly the amount satisfy momentum conservation in the underlying Euclidean space at any lattice site q and time t. The mechanism is analogous to the continuum kinetic theoretic description in a curved space. Writing in the coordinate component form as $F^\alpha(q,t) = x(q,t) \cdot g^\alpha(q)$, where with a direct placement of symbols from the previous subsection, provides $$J(q)F^\alpha(q,t) = -\frac{1}{2}\sum_i c_i^\beta \{\theta_\beta^\alpha(q+c_i,q)N_i'(q,t) - \theta_\beta^\alpha(q-c_i,q)N_i(q,t)\}$$

where the geometric function $\theta_\beta^\alpha(q+c_i,q)N_i'(q,t)$ is defined in (Eq. 11). From (27) and (11), one sees that $F^\alpha(q,t)$ vanishes if the curvilinear mesh is a regular uniform Cartesian lattice, as in conventional LBM. The second constraint in (26) can also be expressed in coordinate component form as $$\sum_i c_i^\alpha \delta N_i(q,t) = J(q)F^\alpha(q,t) \quad \text{(Equation 28)}$$

In order to recover the full viscous Navier-Stokes equation, an additional constraint on the momentum flux also needs is imposed below, $$\sum_i c_i^\alpha c_i^\beta \delta N_i(q,t) = J(q)[\delta \Pi^{\alpha\beta}(q,t) + \delta \Pi^{\beta\alpha}(q,t)] \quad \text{(Equation 29)}$$

with $$\delta \Pi^{\alpha\beta}(q,t) \equiv \quad \text{(Equation 30)}$$
$$-\frac{1}{2}\left(1 - \frac{1}{2\tau}\right)\sum_i c_i^\alpha c_i^\gamma [\theta_\gamma^\beta(q+c_i,q) - \theta_\gamma^\beta(q-c_i,q)]f_i^{eq}(q,t)$$

A specific form of $\delta N_i(\overline{q},t)$ is chosen as:

$$\delta N_i(q,t) = J(q)\left[\frac{c_i^\beta F^\beta(q,t)}{T_0} + \left(\frac{c_i^\beta c_i^\gamma}{T_0} - \delta^{\beta\gamma}\right)\frac{\delta \Pi^{\beta\gamma}(q,t)}{T_0}\right] \quad \text{(Equation 31)}$$

The equation satisfies the moment constraints of Equations 26, 28, and 29. The form of the equilibrium distribution function is defined in order to recover the correct Euler equation as well as the Navier-Stokes equation in curvilinear coordinates in the hydrodynamic limit. In particular, the following fundamental conditions on hydrodynamic moments are:

$$\sum_i f_i^{eq} = \rho, \quad \text{(Equation 32)}$$

$$\sum_i c_i^\alpha f_i^{eq} = \rho U^\alpha,$$

$$\sum_i c_i^\alpha c_i^\beta f_i^{eq} = \Pi^{\alpha\beta,eq} = g^{\alpha\beta}\rho T_0 + \rho \tilde{U}^\alpha \tilde{U}^\beta$$

$$\sum_i c_i^\alpha c_i^\beta c_i^\gamma f_i^{eq} =$$
$$Q^{\alpha\beta\gamma,eq} = [g^{\alpha\beta}\tilde{U}^\gamma + g^{\beta\gamma}\tilde{U}^\alpha + g^{\gamma\alpha}\tilde{U}^\beta]\rho T_0 + \rho \tilde{U}^\alpha \tilde{U}^\beta \tilde{U}^\gamma$$

where in the above, $\tilde{U}^\alpha(q,t) = U^\alpha(q,t) + \frac{1}{2}a^\alpha(q,t)$ These fundamental conditions are met by the following equilibrium distribution form:

$$f_i^{eq} = \rho w_i \left\{ 1 + \frac{c_i^\alpha U^\alpha}{T_0} + \right. \quad \text{Equation 33}$$
$$\frac{1}{2T_0}\left(\frac{c_i^\alpha c_i^\beta}{T_0} - \delta^{\alpha\beta}\right)[(g^{\alpha\beta} - \delta^{\alpha\beta})T_0 + \tilde{U}^\alpha \tilde{U}^\beta] +$$
$$\frac{1}{6T_0^3}\left(c_i^\alpha c_i^\beta c_i^\gamma - T_0(c_i^\alpha \delta^{\beta\gamma} + c_i^\beta \delta^{\gamma\alpha} + c_i^\gamma \delta^{\alpha\beta})\right)[T_0[(g^{\alpha\beta} -$$
$$\delta^{\alpha\beta})\tilde{U}^\gamma + (g^{\beta\gamma} - \delta^{\beta\gamma})\tilde{U}^\alpha +$$
$$\left. (g^{\gamma\alpha} - \delta^{\gamma\alpha})\tilde{U}^\beta] + \tilde{U}^\alpha \tilde{U}^\beta \tilde{U}^\gamma] \right\}$$

The equilibrium distribution form above is analogous to that of a low Mach number expansion of the Maxwell-Boltzmann distribution, but is expressed in curvilinear coordinates. Indeed, equilibrium distribution form above reduces to the standard LBM equilibrium distribution if the curvilinear mesh is a uniform Cartesian lattice with $g^{\alpha\beta} = \delta^{\alpha\beta}$. With all the quantities and dynamics defined above, the lattice Boltzmann Eq. 12 simulated on the (non-Euclidian) uniform Cartesian lattice $\{q\}$ obeys the Navier-Stokes hydrodynamics with curvilinear coordinates. Therefore, mapping the resulting values can be mapped onto the original curvilinear mesh by a simple translation below, $$\rho(x,t) = \rho(q,t),$$

$$u(x,t) = U^\alpha(q,t)g_\alpha(q) \quad \text{Equation 34}$$

Cartesian Coordinates in Non-Euclidean Velocity Space

The morphed "Cartesian" lattice $\{q\}$ that results from deformation (bending, twisting and stretching/compressing) the original curvilinear mesh $\{x\}$ in the Euclidian space can be used in simulation fluids flows about physical bodies in the same manner as conventional Cartesian lattice (x) for the LBM provided that upon advection in the topological structure of the non-Euclidian space "Cartesian" lattice {q} constraints are applied to particle momentum, as discussed above to return the general curvilinear mesh in Euclidian space.

Figure 9:
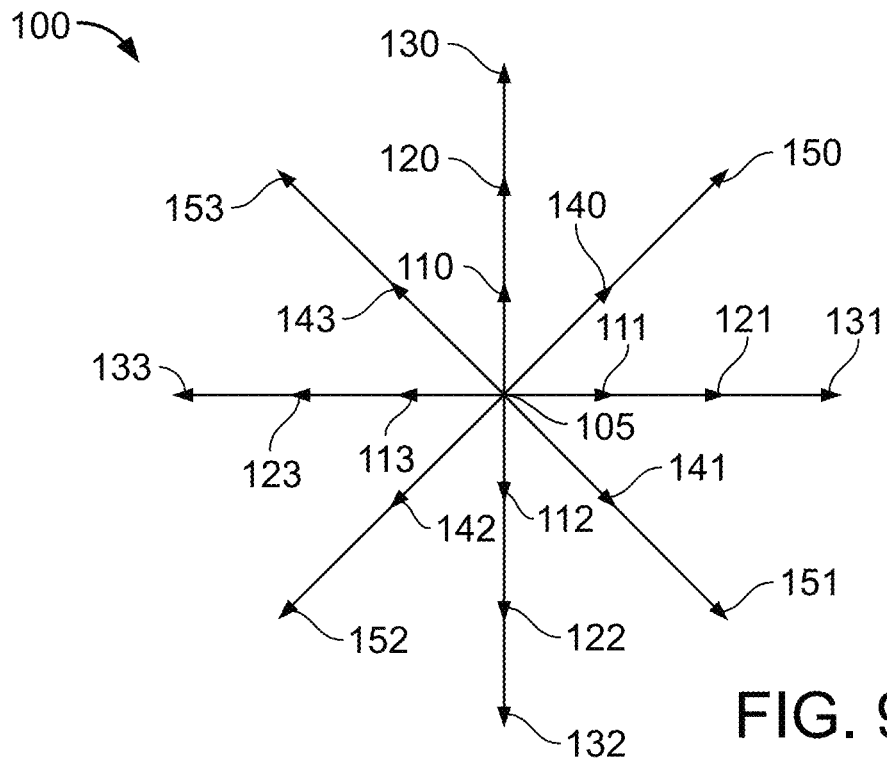
FIGS. 9 and 10 illustrate velocity components of two LBM models represented in non-Euclidian space.

Referring to FIG. 9, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 10:
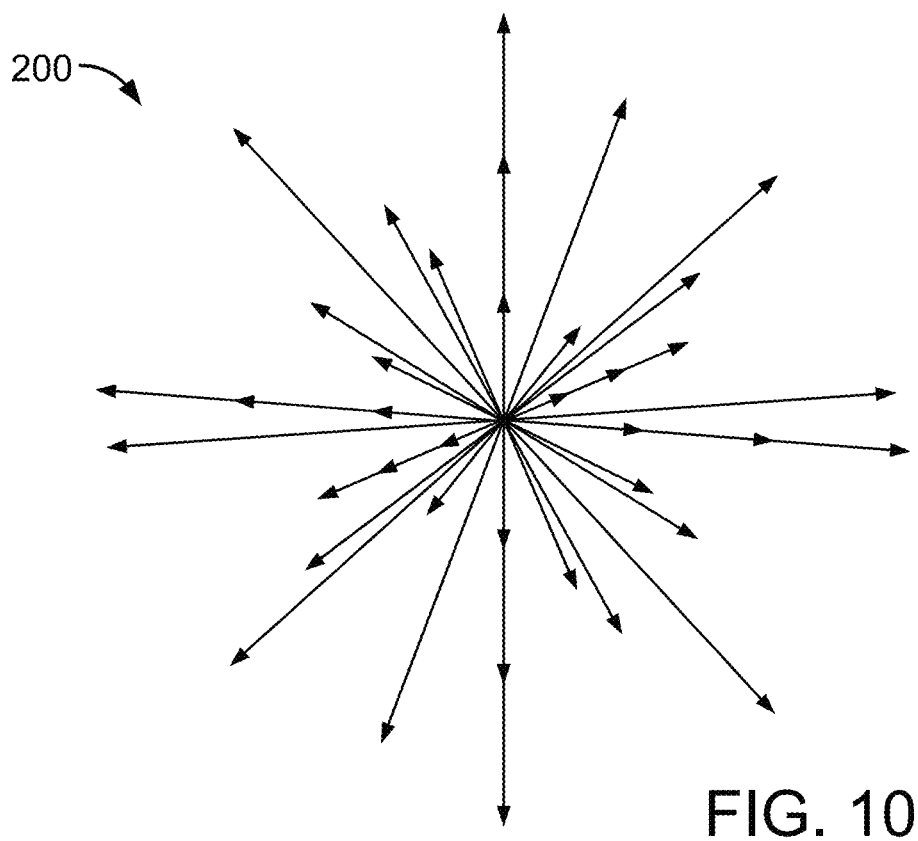

As also illustrated in FIG. 10, a second model (3D-1) 200 is a three-dimensional model that includes 39 velocities, where each velocity is represented by one of the arrowheads of FIG. 9. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates (in non-Euclidean space) in velocity space which facilitates accurate and efficient implementation of discrete velocity models, particularly the kind known as the lattice Boltzmann models. Using such models, flows can be simulated with high fidelity.

Figure 11:
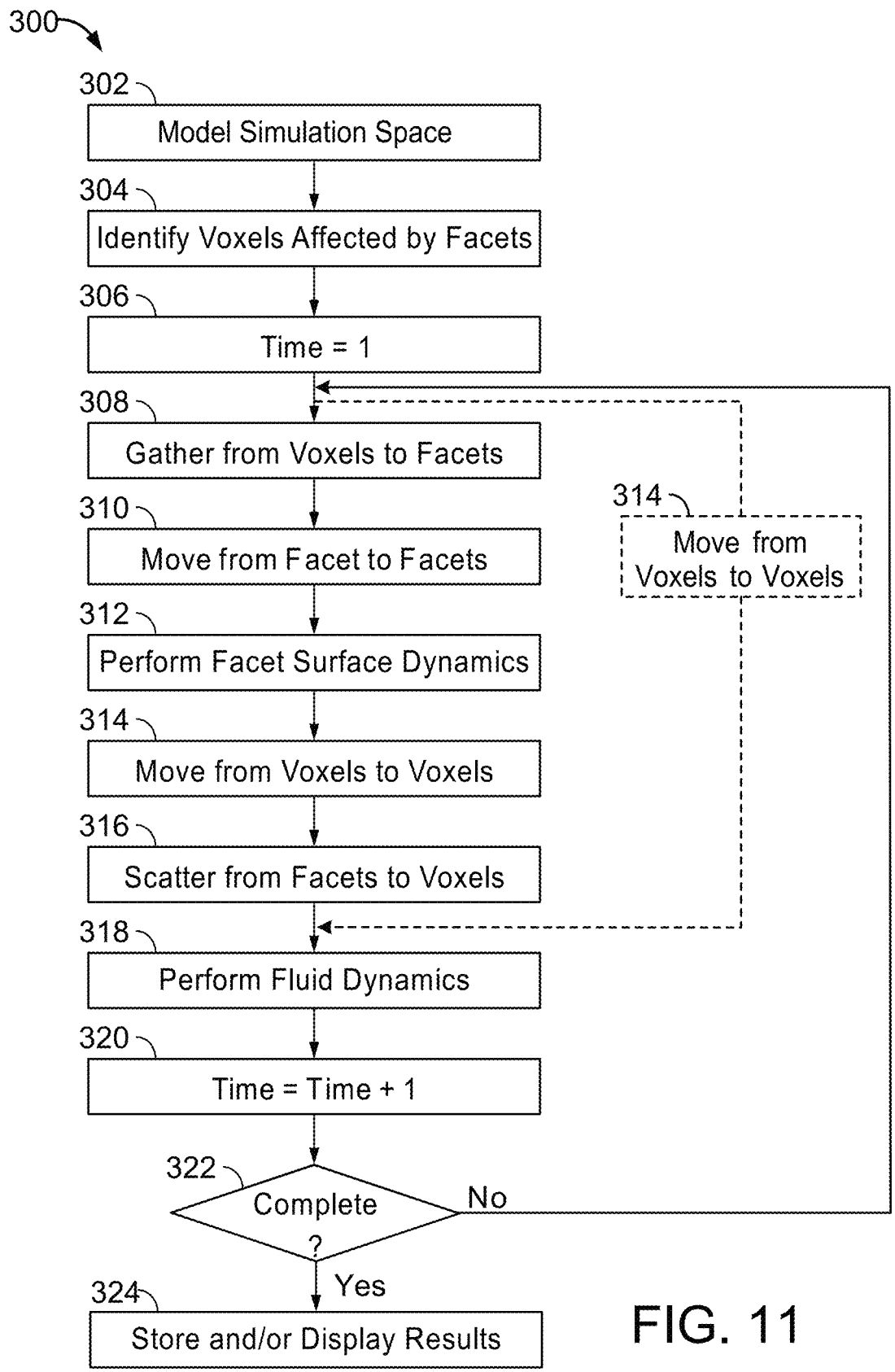
FIG. 11 is a flow chart of a procedure followed by a physical process simulation system.

Referring to FIG. 11, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v.  \qquad \text{Eq.(I.5)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i$ (x, t), where $f_i$ represents the number of elements, or particles, per unit volume in state i (i.e., the density of particles in state i) at a lattice site denoted by the three-dimensional vector x at a time t. For a known time increment, the number of particles is referred to simply as $f_i$ (x). The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{ix}, c_{iy}, c_{iz}).  \qquad \text{Eq.(I.6)}$$

The energy level zero state represents stopped particles that are not moving in any dimension, i.e. $c_{stopped}(0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 12:
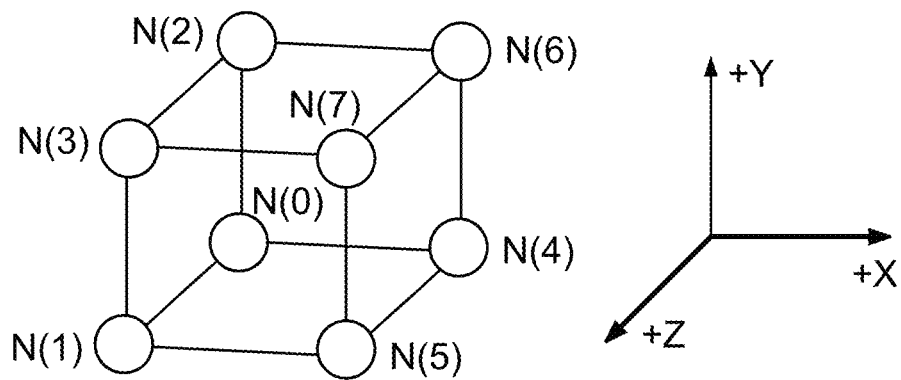
FIG. 12 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$. A microblock is illustrated in FIG. 12.

Figure 13A:
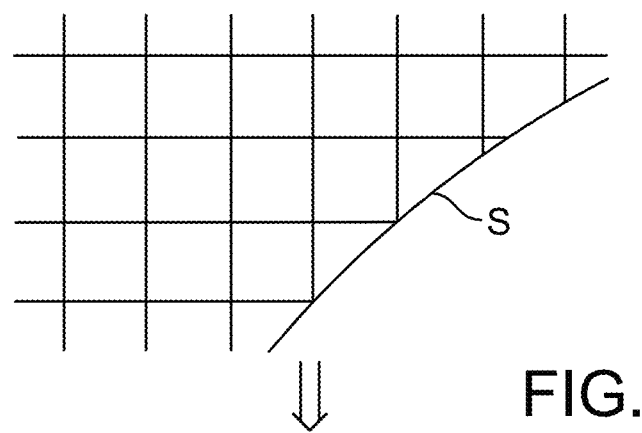
FIGS. 13A and 13B are illustrations of lattice structures in non-Euclidian space used by the system of FIG. 1.
Figure 13B:
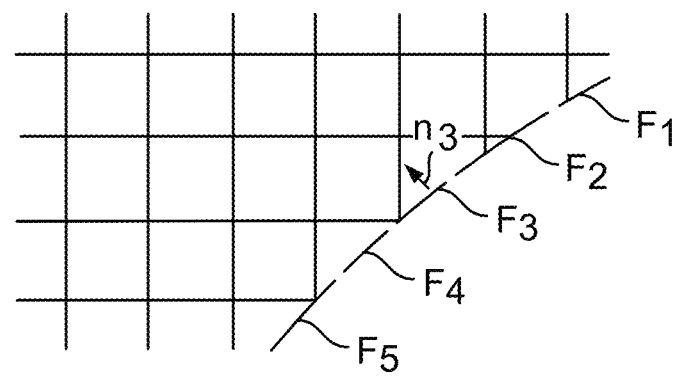

Referring to FIGS. 13A and 13B, a surface S (FIG. 11A) is represented in the simulation space (FIG. 13B) as a collection of facets $F_\alpha$:

$$S = \{F_\alpha\} \qquad \text{Eq.(I.7)}$$

where $\alpha$ is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 14:
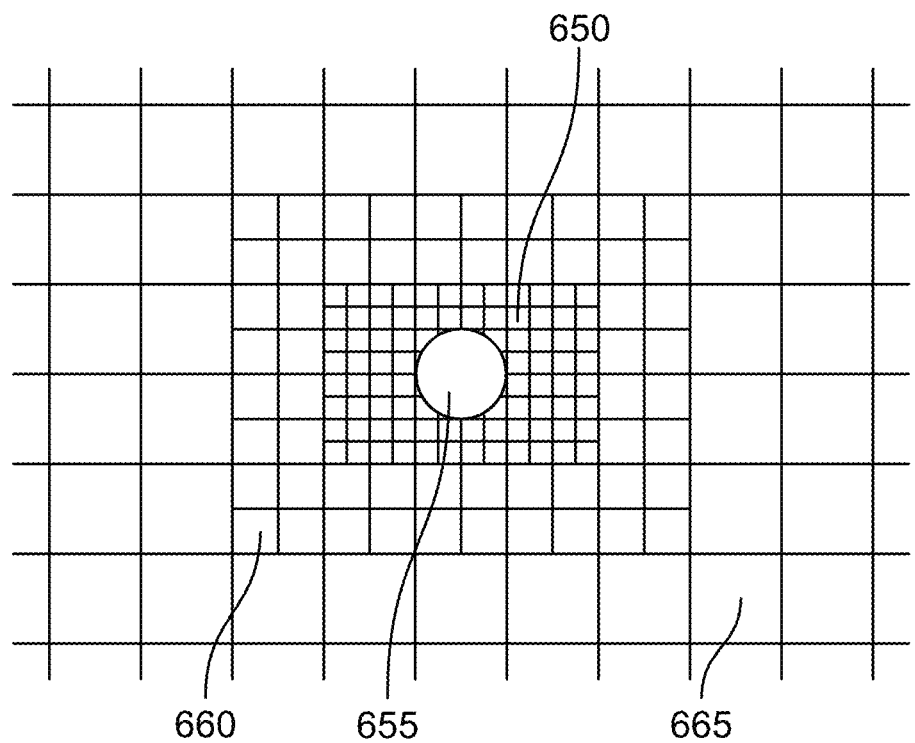
FIGS. 14 and 15 illustrate variable resolution techniques.
Figure 15:
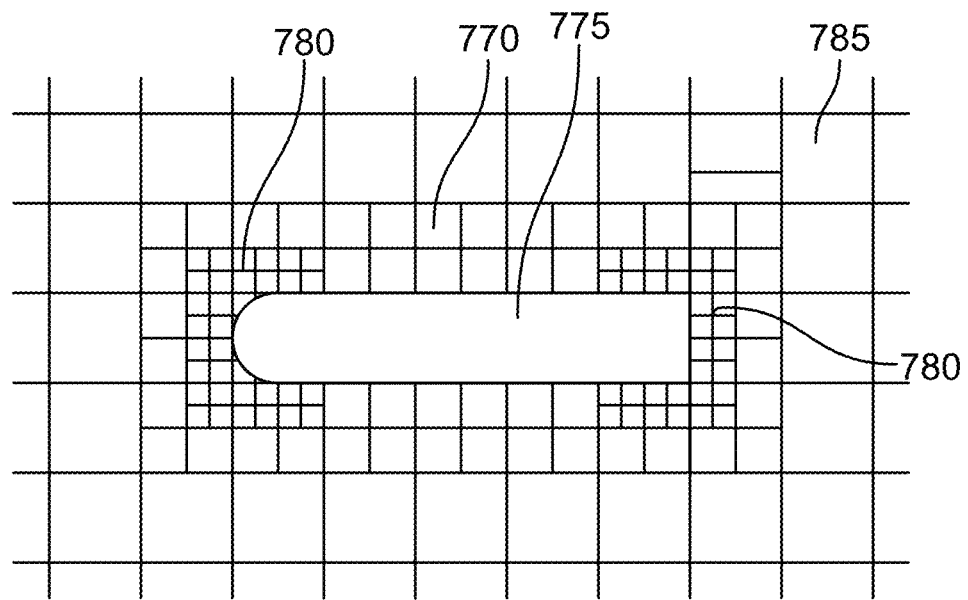

Referring to FIG. 14, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 15, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected by Facets

Referring again to FIG. 11, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 16:
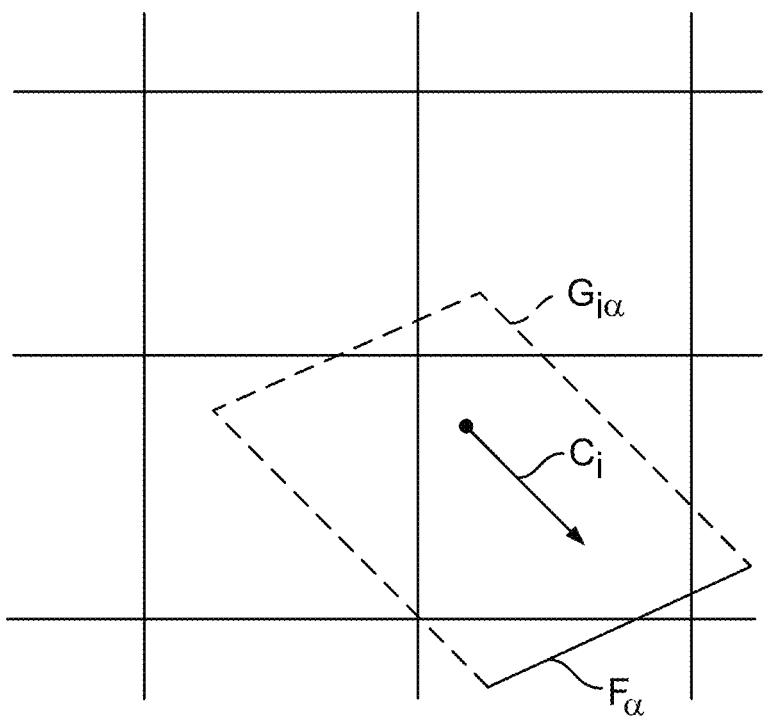
FIG. 16 illustrates movement of particles.

Referring to FIG. 16, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A_\alpha$ of the facet so that the volume $V_{i\alpha}$ of the parallelepiped $G_{i\alpha}$ equals:

$$V_{i\alpha} = |x_i n_\alpha| A_\alpha \qquad \text{Eq.(I.8)}$$

The facet $F_\alpha$ receives particles from the volume Via when the velocity vector of the state is directed toward the facet ($|c_i\ n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(X)$):

$$\Gamma_{i\alpha}(x) = N_i(x) V_{i\alpha}(x). \qquad \text{Eq. (I.9)}$$

When the parallelepiped $G_{i\alpha}$ is intersected by one or more facets, the following condition is true:

$$V_{i\alpha} = \Sigma V_\alpha(x) + V_{i\alpha}(\beta) \qquad \text{Eq. (I.10)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq.(I.11)}$$

D. Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 308). As noted above, the flux of state i particles between a voxel N(x) and a facet Fa is:

$$\Gamma_{i\alpha}(x) = N_i(x) V_{i\alpha}(x). \quad\quad\quad\quad \text{Eq.(I.12)}$$

From this, for each state i directed toward a facet $F_\alpha$ ($c_i n_\alpha < 0$), the number of particles provided to the facet $F_\alpha$ by the voxels is:

$$\Gamma_{i\alpha V \to F} = \Sigma_X \Gamma_{i\alpha}(x) = E_X N_i(x) V_{i\alpha}(x) \quad\quad\quad\quad \text{Eq.(I.13)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 17:
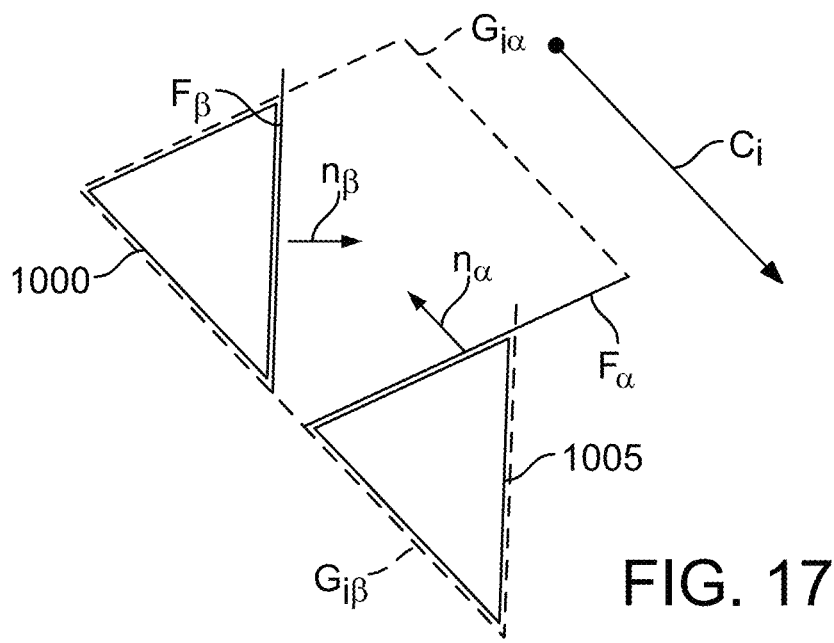
FIG. 17 illustrates regions affected by a facet of a surface.

Next, particles are moved between facets (step 310). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 17, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta) / V_{i\alpha} \quad\quad\quad\quad \text{Eq.(I.14)}$$

where $\Gamma_i(\beta, t-1)$ is a measure of the state i particles produced by the facet $F_\beta$ during the previous time increment. From this, for each state i directed toward a facet $F_\alpha$ ($c_i n_\alpha < 0$), the number of particles provided to the facet $F_\alpha$ by the other facets is:

$$\Gamma_{i\alpha F \to F} = \Sigma_\beta \Gamma_{i\alpha}(\beta) = \Sigma_\beta \Gamma_i(\beta, t-1) V_{i\alpha}(\beta) / V_{i\alpha} \quad\quad\quad\quad \text{Eq.(I.15)}$$

and the total flux of state i particles into the facet is:

$$\Gamma_{iIN}(\alpha) = \Gamma_{i\alpha F \to F} + \Gamma_{i\alpha F \to F} = \Sigma_X N_i(x) V_{i\alpha} + \Sigma_\beta \Gamma_i(\beta, t-1) V_{i\alpha}(\beta) / V_{i\alpha} \quad\quad \text{Eq.(I.16)}$$

The state vector N($\alpha$) for the facet, also referred to as a facet distribution function, has M entries corresponding to the M entries of the voxel states vectors. M is the number of discrete lattice speeds. The input states of the facet distribution function N($\alpha$) are set equal to the flux of particles into those states divided by the volume $V_{i\alpha}$:

$$N_i(\alpha) = \Gamma_{iIN}(\alpha) / V_{i\alpha} \quad\quad\quad\quad \text{Eq.(I.17)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha) / V_{i\alpha} \quad\quad\quad\quad \text{Eq.(I.18)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \quad\quad\quad\quad \text{Eq.(I.19)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero. The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 18:
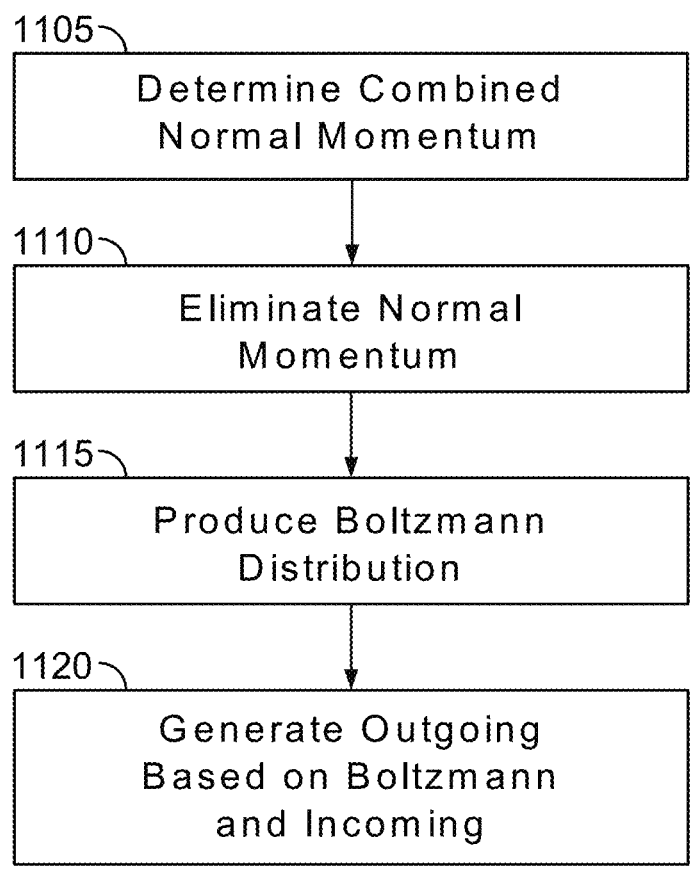
FIG. 18 illustrates a flow chart for surface dynamics.

Next, surface dynamics are performed for each facet to satisfy the four boundary conditions discussed above (step 312). A procedure for performing surface dynamics for a facet is illustrated in FIG. 18. Initially, the combined momentum normal to the facet $F_\alpha$ is determined (step 1105) by determining the combined momentum P($\alpha$) of the particles at the facet as:

$$P(\alpha) = \Sigma_i c_i * N^\alpha \quad\quad\quad\quad \text{Eq. (I.20)}$$

for all i. From this, the normal momentum $P_n(\alpha)$ is determined as:

$$P_n(\alpha) = n_\alpha P(\alpha). \quad\quad\quad\quad \text{Eq.(I.21)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is determined (step 1120) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha) = \Gamma_{iIN}(\alpha) - N_{n-\beta i}(\alpha)V_{i\alpha} \quad \text{Eq.(I.22)}$$

Using this difference, the outgoing flux distribution is:

$$\Gamma_{iOUT}(\alpha) = N_{n-\beta i}(\alpha)V_{i\alpha} - \Delta\cdot\Gamma_i^*(\alpha), \quad \text{Eq.(I.23)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha) = N_{n-\beta i}(\alpha)V_{i\alpha} - \Delta\Gamma_i^*(\alpha) + C_f(n_\alpha \cdot c_i) - [N_{n-\beta i}^* (\alpha) - N_{n-\beta i}(\alpha)]V_{i\alpha} + (n_\alpha \cdot c_i)(t_{1\alpha}\cdot c_i)\Delta N_{j,1}V_{i\alpha} + (n_\alpha \cdot c_i)(t_{2\alpha}\cdot c_i)\Delta N_{j,2}V_{i\alpha} \quad \text{Eq.(I.24)}$$

for $n_\alpha c_i > 0$, where $C_f$ is a function of skin friction, $t_{i\alpha}$ is a first tangential vector that is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}(n_\alpha \sum_i c_i c_i N_{n-Bi}(\alpha) \cdot t_{1,2\alpha} \quad \text{Eq. (I.25)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha)n_\alpha)/\rho, \quad \text{Eq.(I.26)}$$

where $\rho$ is the density of the facet distribution:

$$\rho = \sum_i N_i(\alpha) \quad \text{Eq. (I.27)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha)V_{i\alpha}. \quad \text{Eq.(I.28)}$$

The outgoing flux distribution then becomes:

$$\Gamma_{iOUT}(\alpha) = N_{n-\beta i}(\alpha)V_{i\alpha} - \Delta\Gamma_i^*(\alpha) + C_f(n_\alpha c_i)[N_{n-\beta i}^*(\alpha) - N_{n-\beta i}(\alpha)]V_{i\alpha}, \quad \text{Eq.(I.29)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = p_\alpha n_\alpha A_\alpha - C_i \rho_\alpha u_i A_\alpha \quad \text{Eq. (I.30)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i,c_{ji} \cdot n_\alpha < 0} \Gamma_{\alpha jiIN} - \sum_{i,c_{ji} \cdot n_\alpha > 0} \Gamma_{\alpha jiOUT} \quad \text{Eq. (I.31)}$$

where the index j denotes the energy of the state i. This energy difference is then used to generate a difference term:

$$\Delta\Gamma_{\alpha ji} = V_{i\alpha}\Delta\Gamma_{\alpha mj}, \sum_{i,c_{ji}\cdot n_\alpha < 0} V_{i\alpha} \quad \text{Eq. (I.32)}$$

for $c_{ji} n_\alpha > 0$. This difference term is used to modify the outgoing flux so that the flux becomes:

$$\Gamma_{\alpha jiOUTf} = \Gamma_{\alpha jiOUT} + \delta\Gamma_{\alpha ji} \quad \text{Eq.(I.33)}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +x and +y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet.

Figure 19:
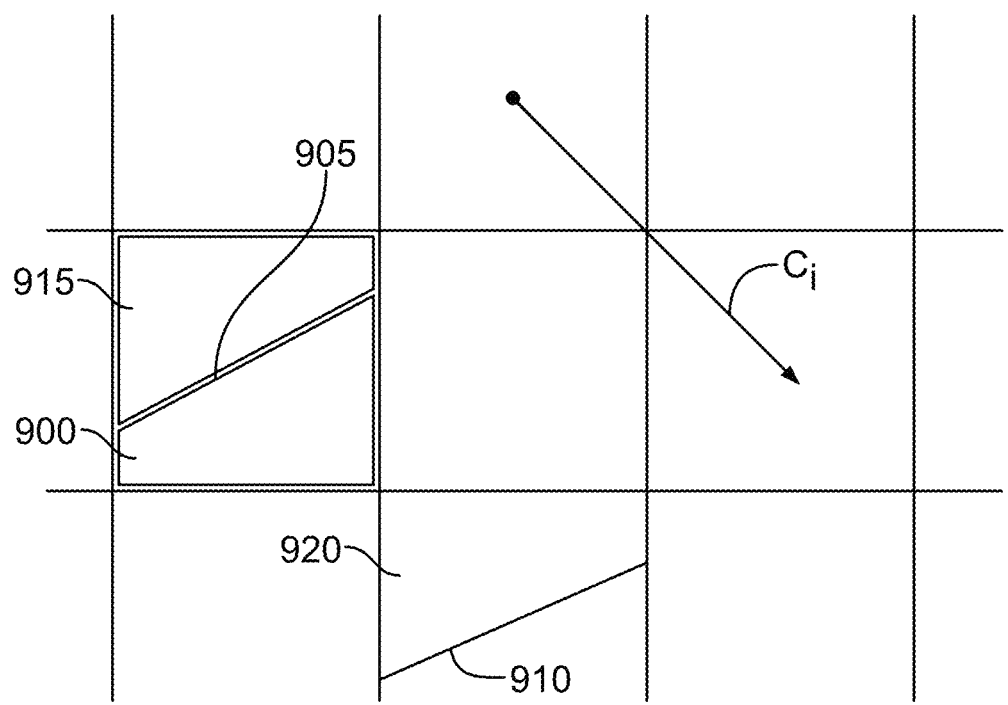
FIG. 19 illustrates movement of particles from a voxel to a surface.

Referring to FIG. 19, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(ƒ) occupied by one or more facets is:

$$N_i(f) = N_i(x)\left(1 - \sum_\alpha V_{i\alpha}(x)\right) \quad \text{Equation 34}$$

where N(x) is the source voxel.

6. Scatter from Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N (x) is:

$$N_{\alpha i F \to V} = \frac{1}{P_f(x)} V_{i\alpha}(x)\Gamma_{\alpha i OUT_f}/V_{\alpha i} \quad \text{Equation 35}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x)\Gamma_{\alpha i OUT_f}/V_{\alpha i} \quad \text{Equation 36}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Fluid dynamics are performed (step 318) FIG. 11. This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation I.1 and Equation I.2. After the advection step, the conserved quantities of a fluid system, specifically the density, momentum and the energy are obtained from the distribution function using Equation I.3. From these quantities, the equilibrium distribution function, noted by $f^{eq}$ in equation (I.2), is fully specified by Equation (I.4). The choice of the velocity vector set $c_i$, the weights, both are listed in Table 1, together with Equation I.2 ensures that the macroscopic behavior obeys the correct hydrodynamic equation.

E. Variable Resolution

Figure 20:
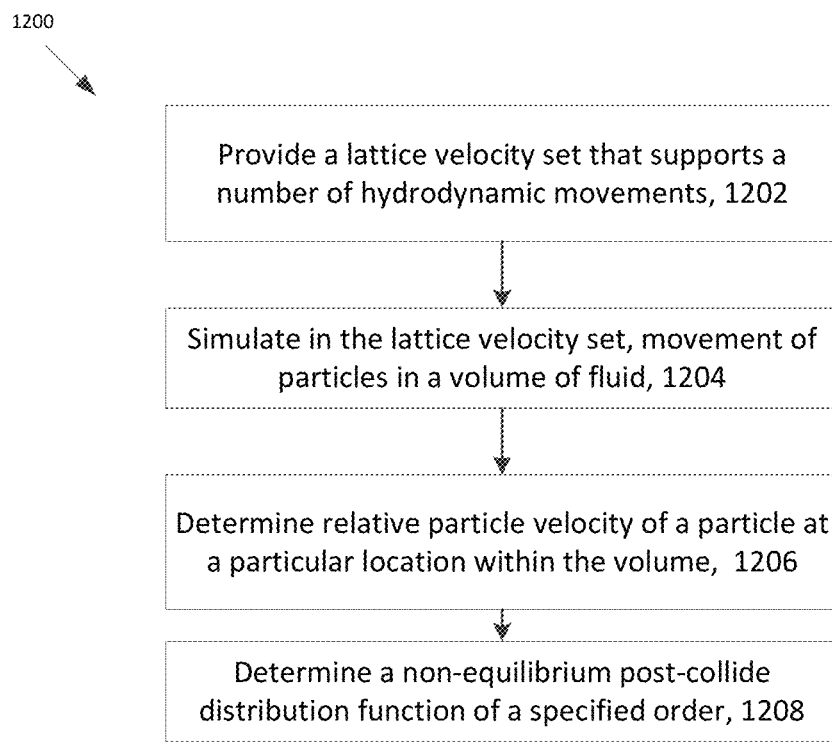
FIG. 20 is a flow chart of a procedure for performing surface dynamics.

Referring to FIG. 20, variable resolution (as discussed above) employs voxels of different sizes, hereinafter referred to as coarse voxels 12000 and fine voxels 1205. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1210.

When variable resolution is employed at or near a surface, facets may interact with voxels on both sides of the VR interface. These facets are classified as VR interface facets 1215 ($F_{\alpha IC}$) or VR fine facets 1220 ($F_{\alpha IF}$). A VR interface facet 1215 is a facet positioned on the coarse side of the VR interface and having a coarse parallelepiped 1225 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1220 is a facet positioned on the fine side of the VR interface and having a fine parallelepiped 1230 extending into a coarse voxel. Processing related to interface facets may also involve interactions with coarse facets 1235 ($F_{\alpha C}$) and fine facets 1240 ($F_{\alpha F}$).

For both types of VR facets, surface dynamics are performed at the fine scale, and operate as described above. However, VR facets differ from other facets with respect to the way in which particles advect to and from the VR facets.

Figure 21:
FIG. 21 is a screen shot representative of a fluid simulation.

FIG. 21 shows a screenshot of a fluid simulation. A fluid simulation that used the above described curvilinear approach (rather than conventional Cartesian approach or possibly other approaches to curvilinear meshes) would provide a similar depiction of the fluid simulation as well as any customary corresponding calculated data outputs. However, such a fluid simulation that used the above described curvilinear approach may conduct the fluid simulation faster and or by using less computation resources that other approaches when an object, e. g., an actual physical object, having curvilinear surfaces is modeled.

A number of implementations have been described. Nevertheless, it will be understood that various modifications may be made without departing from the spirit and scope of the claims. Accordingly, other implementations are within the scope of the following claims.

What is claimed is:

1. A computer implemented method for simulating a fluid flow about a surface of a solid, the method comprising:
receiving by the computing system, a coordinate system for representation of a curvilinear mesh that conforms to the surface of the solid;
simulating, with a lattice velocity set transport of particles in a volume of fluid, with the transport causing collision among the particles;
executing a distribution function for transport of the particles, with the distribution function including a particle collision determination and a change in particle distribution associated with the curvilinear mesh;
performing by the computing system, advection operations in the coordinate system under constraints applied to particle momentum values; and
mapping by the computer system values resulting from simulating onto the curvilinear mesh by translation of the particle momentum values and spatial coordinates determined in the coordinate system into momentum and spatial values in the curvilinear space.

2. The computer method of claim 1 wherein the solid surface is a curved, solid surface.

3. The computer method of claim 1 wherein the mesh is a curvilinear mesh in Euclidian space.

4. The computer method of claim 1 wherein the coordinate system is a non-Euclidian space defined in Riemannian geometry.

5. The computer method of claim 1 wherein the general curvilinear coordinate system has a one-to-one mapping to the selected coordinate system that is a Cartesian coordinate system in non-Euclidian space.

6. The computer method of claim 3 wherein particle advection is performed so that a particle distribution function is uniquely advected from one voxel (lattice site) to another voxel in each time step.

7. The computer method of claim 1 wherein the change in particle distribution causes the computing system to simulate an application of a force applied in each voxel at each time increment in the curvilinear mesh to enforce an exact momentum conservation in the coordinate system.

8. The computer method of claim 3 wherein volumetric representation is used so that each voxel in a general curvilinear mesh has a defined volume, and mass conservation is enforced and mass and momentum densities are defined.

9. The computer method of claim 1 wherein mapping further comprises:
determining momentum states constrained as a result of the representation of the mesh and the solid surface in the Cartesian coordinate system in non-Euclidean space.

10. Apparatus for simulating a fluid flow about a surface of a solid, the apparatus comprising:
a memory;
one or more processor devices configured to:
receive a coordinate system for representation of a curvilinear mesh that conforms to the surface of the solid;
simulate with a lattice velocity set, transport of particles in a volume of fluid, with the transport causing collision among the particles;
execute a distribution function for transport of the particles, with the distribution function including a particle collision determination and a change in particle distribution associated with the curvilinear mesh;
perform advection operations in the coordinate system under constraints applied to particle momentum values; and
map values resulting from simulating onto the curvilinear mesh by translation of the particle momentum values and spatial coordinates determined in the coordinate system into momentum and spatial values in the curvilinear space.

11. The apparatus of claim 10 wherein the solid surface is a curved, solid surface.

12. The apparatus of claim 10 wherein the mesh is a curvilinear mesh in Euclidian space.

13. The apparatus of claim 10 wherein the coordinate system is a non-Euclidian space defined in Riemannian geometry.

14. The apparatus of claim 10 wherein the general curvilinear coordinate system has a one-to-one mapping to the selected coordinate system that is a Cartesian coordinate system in non-Euclidian space.

15. The apparatus of claim 12 wherein particle advection is performed so that a particle distribution function is uniquely advected from one voxel to another voxel in each time step.

16. The apparatus of claim 10 wherein the change in particle distribution causes the computing system to simulate an application of a force applied in each voxel at each time increment in the curvilinear mesh to enforce an exact momentum conservation in the coordinate system.

17. The apparatus of claim 12 wherein volumetric representation is used so that each voxel in a general curvilinear mesh has a defined volume, and mass conservation is enforced and mass and momentum densities are defined.

18. The apparatus of claim 10 wherein mapping further comprises:
determining momentum states constrained as a result of the representation of the mesh and the solid surface in the Cartesian coordinate system in non-Euclidean space.

19. One or more machine-readable hardware storage devices storing instructions that are executable by one or more processing devices to cause a computer to
receive a coordinate system for representation of a curvilinear mesh that conforms to the surface of the solid;
simulate with a lattice velocity set, transport of particles in a volume of fluid, with the transport causing collision among the particles;
execute a distribution function for transport of the particles, with the distribution function including a particle collision determination and a change in particle distribution associated with the curvilinear mesh;
perform advection operations in the coordinate system under constraints applied to particle momentum values; and
map values resulting from simulating onto the curvilinear mesh by translation of the particle momentum values and spatial coordinates determined in the coordinate system into momentum and spatial values in the curvilinear space.

20. The one or more machine-readable hardware storage devices of claim 19 wherein the mesh is a curvilinear mesh in Euclidian space.

* * * * *